(12) United States Patent
Bechtolsheim et al.

(10) Patent No.: US 6,956,852 B1
(45) Date of Patent: Oct. 18, 2005

(54) MULTI-FUNCTION HIGH-SPEED NETWORK INTERFACE

(75) Inventors: Andreas V. Bechtolsheim, Stanford, CA (US); Howard M. Frazier, Pleasanton, CA (US); Thomas J. Edsall, Cupertino, CA (US)

(73) Assignee: Cisco Technology Inc., San Jose, CA (US)

( * ) Notice: Subject to any disclaimer, the term of this patent is extended or adjusted under 35 U.S.C. 154(b) by 0 days.

(21) Appl. No.: 09/339,963

(22) Filed: Jun. 25, 1999

(51) Int. Cl.[7] ............................................... H04L 12/00
(52) U.S. Cl. ............................................................. 370/389
(58) Field of Search ........................... 370/235–238, 370/252, 389, 392, 394, 397–399, 536, 419, 395.3, 395.5–395.53, 466–467; 709/230–231, 236, 311, 203

(56) References Cited

U.S. PATENT DOCUMENTS

| | | | |
|---|---|---|---|
| 4,958,344 A | | 9/1990 | Scott |
| 5,537,403 A | * | 7/1996 | Cloonan et al. ............ 370/352 |
| 5,566,193 A | | 10/1996 | Cloonan |
| 5,570,356 A | * | 10/1996 | Finney et al. ............... 370/476 |
| 5,587,709 A | | 12/1996 | Jeong |
| 5,613,069 A | * | 3/1997 | Walker ....................... 709/238 |
| 5,625,563 A | | 4/1997 | Rostoker et al. |
| 5,675,584 A | | 10/1997 | Jeong |
| 5,864,303 A | | 1/1999 | Rosen et al. |
| 5,959,987 A | * | 9/1999 | Humphrey et al. ......... 370/352 |
| 6,320,877 B1 | * | 11/2001 | Humphrey et al. ......... 370/474 |
| 6,363,078 B1 | * | 3/2002 | Garcia et al. ............... 370/438 |
| 6,389,029 B1 | * | 5/2002 | McAlear ..................... 370/402 |
| 6,408,002 B1 | * | 6/2002 | Quattromani et al. ....... 370/394 |
| 6,426,943 B1 | * | 7/2002 | Spinney et al. ............. 370/235 |

* cited by examiner

Primary Examiner—Chi Pham
Assistant Examiner—Thai Hoang
(74) Attorney, Agent, or Firm—Jay A. Chesavage (57) ABSTRACT

A high speed communications interface divides data into a plurality of lanes, each lane encoded with clocking information, serialized, and sent to an interface. During cycles when there is no available data to send, IDLE_EVEN and IDLE_ODD cells are sent on alternating cycles. Data is transmitted by sending a header which spans all lanes and includes a START symbol. The final data transaction includes a Frame Check Sequence (FCS) which operates over the entire header and data. The packet is terminated by an END symbol, which is sent after the final data, and the remainder of the lanes are padded with IDLE_EVEN, IDLE_ODD, IDLE_EVEN_BUSY, or IDLE_ODD_BUSY cycles. The interface has a variable clock rate.

65 Claims, 11 Drawing Sheets

Figure 1:
PRIOR ART
Ethernet Packet

Figure 2:
PRIOR ART
ATM Cell

Figure 3a:
GX Packet Format

Figure 3b:
GX Header

Figure 4:
GX Data Stream

Figure 5: GX Packet

Figure 6: GX-Ethernet

Figure 7: GX-Native IP

Figure 8: GX-ATM

Figure 9: GX-FDDI

Figure 10: GX-Token Ring

Figure 14:
GX Packet Format (n=1)

Figure 15:
Transmit Processor
(n=8)

Figure 16:
Transmit Processor (n=4)

Figure 17a:
8B/10B Encoder

Figure 17b:
8B/10B Encoder

| | 8B Input | Ctrl Input | 10B Output |
|---|---|---|---|
| 440 | START | CTRL | Start |
| 442 | 8B_Data | DATA | 10B_Data |
| 444 | END | CTRL | End |
| 446 | IDLE-EVEN | CTRL | Even_Idle |
| 448 | IDLE-ODD | CTRL | Odd_Idle |
| 449 | IDLE-EVEN_BUSY | CTRL | Even_Idle_Busy |
| 450 | IDLE-ODD_BUSY | CTRL | Odd_Idle_Busy |

Figure 18:
Receive Processor (n=8)

Figure 19:
Receive Processor (n=4)

Figure 20a:
10B/8B Decoder

Figure 20b:
10B/8B Decoder

| | 10B Input | 8B Output | Ctrl Output |
|---|---|---|---|
| 470 | Start | START | CTRL |
| 472 | 10B_Data | 8B_Data | DATA |
| 474 | End | END | CTRL |
| 476 | Even_Idle | IDLE-EVEN | CTRL |
| 478 | Odd_Idle | IDLE-ODD | CTRL |
| 480 | Even_Idle_Busy | IDLE-EVEN-BUSY | CTRL |
| 482 | Odd_Idle_Busy | IDLE-ODD-BUSY | CTRL |

MULTI-FUNCTION HIGH-SPEED NETWORK INTERFACE

FIELD OF THE INVENTION

The current data communication invention is directed to a high speed network interface that is capable of the transmission and reception of multiple types of variable length data packets. In addition, the invention includes a media access control mechanism. Data packets can be sent over a variety of physical media, including single mode fiber, multi-mode fiber, and parallel fibers.

BACKGROUND OF THE INVENTION

In data communications networks, a large number of methods are used to encapsulate communication data packets such as OSI (Open Systems Interconnect) layer 3 TCP/IP packets for the purpose of transmission over local or layer 2 networks and over specific point to point layer 1 physical links. Examples of OSI layer 2 network encapsulation and transmission and access control methods include 10 Mb Ethernet, 100 Mb Ethernet, gigabit Ethernet (IEEE 802.3z), IEEE 802.1Q, IEEE 802.3x, FDDI (ANSI X3T9.5), and token ring (IEEE 802.5). There are also a large number of methods to encapsulate layer 3 packets for transmission over layer 2 networks. For point to point links, available encapsulations include PPP over HDLC (RFC1661), and Packet over Sonet (IETF RFC1619).

In a generic Ethernet packet, the header information that is immediately needed for a switching decision is the layer 2 media access control (MAC) source and destination addresses and, optional 802.1Q tag information. For an IP packet, routing information is contained in the IP source and destination addresses. The MAC source and destination addresses are used for layer 2 switching, wherein the destination address is matched with the port having previously received a source address of the same value. The layer 2 source and destination information is readily available in the first 12 bytes of the Ethernet packet, and generally presents no challenge in extraction. Higher level layer 3 Internet Protocol (IP), and other types of protocol packets present somewhat greater difficulty. For IP, a 32 bit IP source and 32 bit IP destination address are needed for the routing decision, and the hardware must go through a decision tree to determine what type of packet is being examined, what protocol type it is, and thereafter extract addressing information. Virtual Local Area Network (VLAN) information may be added indicating which VLAN the packet has membership. Each switch keeps a copy of a table with the VLAN value associated with a port of exit. When a packet bearing this VLAN value arrives, a hardware-based lookup is performed into a table, which yields the associated port of exit for the packet. If the decision tree determines that the packet is not of a supported type, then the treatment reverts back to the layer 2 switching treatment of a simple Ethernet packet, and the time spent examining the packet is lost. Additionally, for each separate protocol, such as IP, IPX, Appletalk, etc., this examination of the packet must occur, and the information will appear in different places and formats in the packet. It would be useful to have a single method of access for the transmission and reception of switching and routing information for such data packets including a common header format.

OBJECTS OF THE INVENTION

A first object of the invention is to provide a packet encapsulation that includes a start symbol and a type field which provides for the encapsulation of a variety of data packet types, including Ethernet, FDDI, Token Ring, ATM cells, and others.

A second object of the invention is a packet encapsulation that provides for layer 2 prioritization and virtual LAN information for any type of data packet.

A third object of the invention is the provision of a header field which allows application specific packet information in addition to the payload.

A fourth object of the invention is the provision of a CRC that includes the header and payload of the packet.

A fifth object of the invention is to provide for data transmission at a variety of speeds.

A sixth object of the invention is the provision of a flow control mechanism to the media as indicated by the receiver.

A seventh object of the invention is to allow data transmission in a variety of encodings in a transmission and reception media, including a serial channel, as well as any number of parallel channels.

SUMMARY OF THE INVENTION

The present invention comprises a method for encoding and decoding data referred to as GX packets, a transmit processor, and a receive processor. The transmit processor includes a transmit buffer/controller dividing the data into a plurality of transmit data lanes, a plurality of transmit encoders, each encoder accepting information from a unique transmit data lane and producing an output stream of clock-encoded data, and a plurality of transmit serializers, each accepting a unique stream of transmit encoded data, and serially encoding it for transmission. A variable-speed transmit clock circuit affords clocking of the elements of the transmit processor. The transmit encoders add clock recovery information to the data stream, optionally using the 8B/10B encoding method, and also insert START, END, IDLE_EVEN, IDLE_ODD, IDLE_EVEN_BUSY, and IDLE_ODD_BUSY information as instructed by the input buffer/controller. The receive processor comprises a plurality of receive deserializers, each receiving a serial stream of encoded data, and producing a stream of parallel encoded data. These encoded parallel streams are passed on to a plurality of receive decoders, each of which decodes a stream of encoded data into a stream of byte information, as well as decoding control information such as START, END, IDLE_EVEN, IDLE_ODD, IDLE_EVEN_BUSY, and IDLE_ODD_BUSY. The receive processor/controller accepts these streams of data and control signals, organizes the recovered byte streams into recovered packets, and also reports errors associated with the data recovery process. A recovered receive clock for each data lane is used to clock synchronized data into the elasticity buffer of the receive processor.

BRIEF DESCRIPTION OF THE DRAWINGS

FIG. 17b shows the encoding scheme for the encoder of is FIG. 17a.

FIG. 20b shows the decoding scheme for the decoder of FIG. 20a.

DETAILED DESCRIPTION OF THE INVENTION

Figure 1:
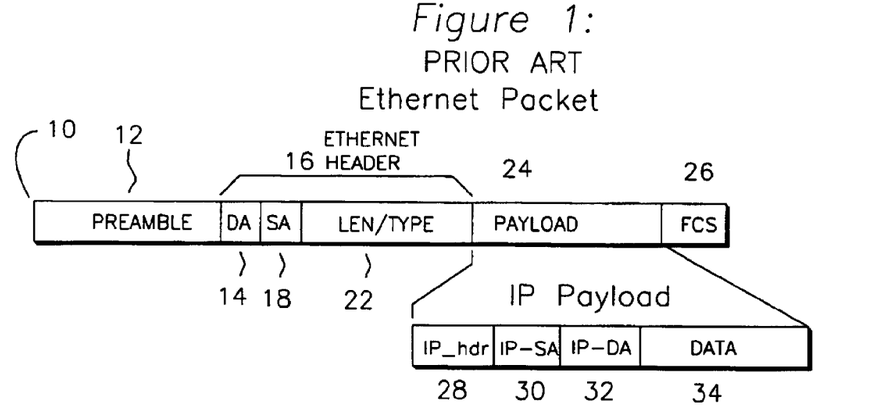
FIG. 1 is a prior art IEEE 802.3 Ethernet Packet including an IP payload.

FIG. 1 shows a prior art layer 2 Ethernet Packet 10, comprising a preamble 12, a header 16 comprising a MAC Destination Address 14, a MAC Source Address 18, and length/type information 22. Payload 24 is followed by the Frame Check Sequence 26 which is a Cyclical Redundancy Check (CRC) polynomial applied over the entire Ethernet header 16 and payload 24. For a generic layer 2 Ethernet packet, payload 24 contains the data. In the case of a layer 3 protocol such as IP, payload 24 is arranged to further comprise an IP header 28, an IP source address 30, and an IP destination address 32, followed by the IP data 34. Other layer 3 protocols such as Appletalk, IPX, and the like have alternate arrangements for payload 24, but in general carry a layer-related source and destination address observed by the particular protocol. Other attributes of Ethernet packet 10 include variable length payload 24, which may vary from 46 bytes to 1500 bytes, as defined in the MAC layer specification IEEE 802.3. The general attributes of prior art packets as described in FIG. 1 include both layer 2 (MAC) and layer 3 (network) source and destination addresses, and variable length data 24. These are used individually, or in combination, by network switches and routers to forward packets across layer 2 subnets, and represents information for which the switching hardware generally needs immediate access for the switching/routing decision.

Figure 2:
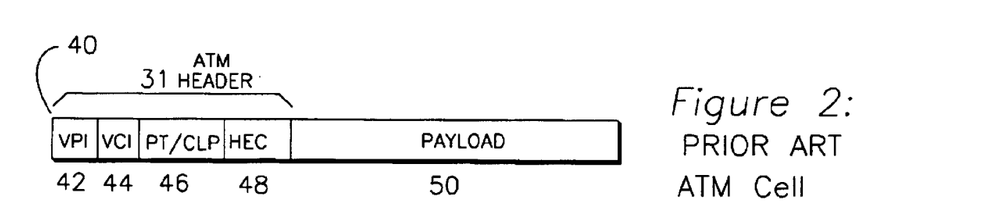
FIG. 2 is a prior art ATM cell.

FIG. 2 shows an ATM cell 40 generally used in an ATM switching network. ATM networks set up. end-to-end connections according to ATM Forum User Network Interface (UNI 3.1) protocols prior to the transmission of actual network data. The characteristic of ATM cells is a fixed 53 byte cell comprising a 5 byte ATM header 31 and a 48 byte payload 50. The header contains an 8 bit VPI (virtual path index) 42 and a 16 bit VCI (virtual circuit index) 44, which is locally assigned and kept as an index into a look-up table which associates an exit port with this index.

Figure 3A:
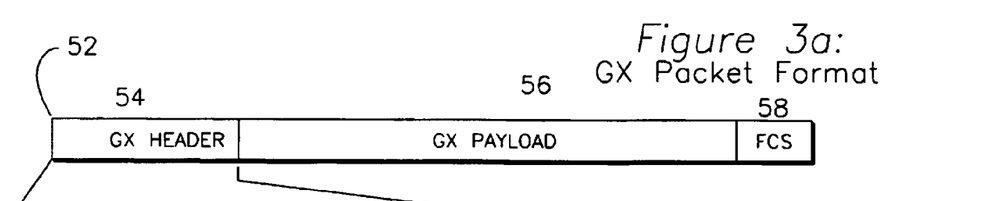
FIG. 3a shows the GX packet format with header details.

FIG. 3a shows the GX packet format for the present invention. GX packet 52 comprises a GX header 54, a GX payload 56, and a Frame Check Sequence (FCS) 58, which operates over the entire GX header 54 and GX payload 56

Figure 3B:
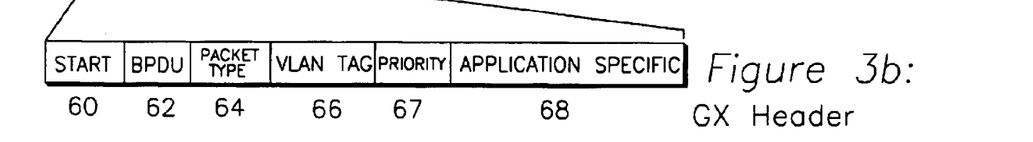
FIG. 3b shows the header for the GX packet.

FIG. 3b shows the details of the GX header of FIG. 3a. GX header 54 includes a START symbol 60. BPDU field 62 is a Bridge Protocol Data Unit field, which flags the following data as configuration information used by the spanning tree algorithms such as IEEE 802.1D, or other configuration information which needs to be given higher priority against packet loss during times of network congestion. Packet type field 64 indicates the type of GX payload data, such as ATM cell, Ethernet, FDDI, etc. VLAN field 66 contains VLAN information, PRIORITY field 67 indicates priority information, and Application Specific field 68 allows for the optional transmission of information specific to the needs of the data communication system.

Figure 4:
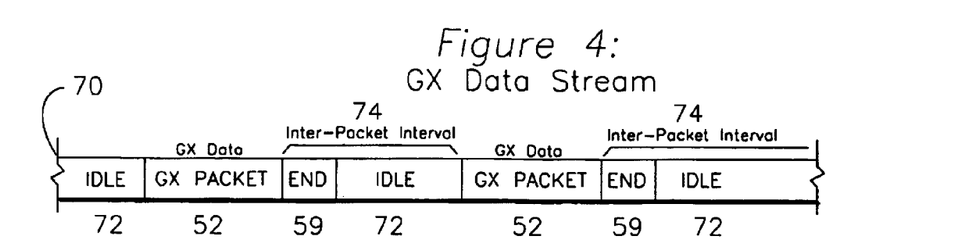
FIG. 4 shows a data stream including packets and inter-packet intervals.

FIG. 4 shows a GX data stream 70 comprising a plurality of GX packets 52, each followed by an inter-packet interval 74 which comprises an END 59 symbol and a variable amount of IDLE 72 time. The END symbol 59 immediately follows the GX FCS 58 of the preceding GX packet 52, and the variable IDLE 72 time allows for the continuous synchronization of the receiver during times when data is not being transmitted.

Figure 5:
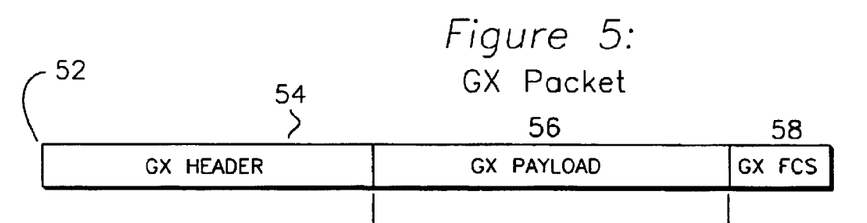
FIG. 5 shows the GX packet format with payload details.

FIG. 5 shows examples of different GX payload 56 formats, illustrated by the FIGS. 6 through 10.

Figure 6:
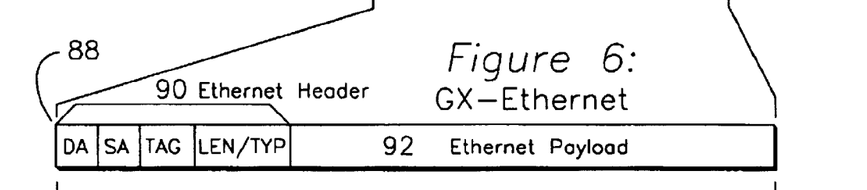
FIG. 6 shows the case where the GX payload is an Ethernet packet.

FIG. 6 shows the GX payload 56 as a prior art Ethernet packet, comprising Ethernet header 90, and Ethernet payload 92. The Ethernet FCS 26 is not transmitted, since the GX FCS 58 serves this error checking function in GX links.

Figure 7:
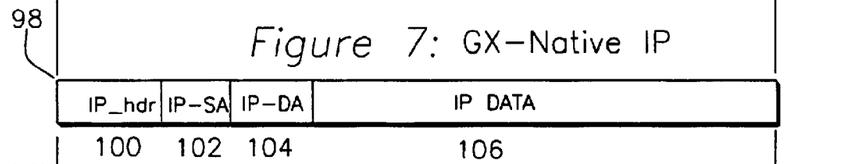
FIG. 7 shows the case where the GX payload is a native IP packet.

FIG. 7 shows a native IP payload comprising an IP frame 98 having an IP header 100, IP source address 102, IP destination address 104, and IP data 106.

Figure 8:
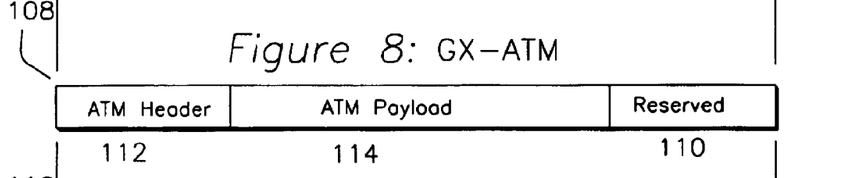
FIG. 8 shows the case where the GX payload is an ATM cell.

FIG. 8 shows the GX payload 56 comprising an ATM format 108 including a reserved field 110, ATM header 112, and ATM payload 114. The optional reserved field 110 may occur before the ATM header 112 or after the ATM payload 114.

Figure 9:
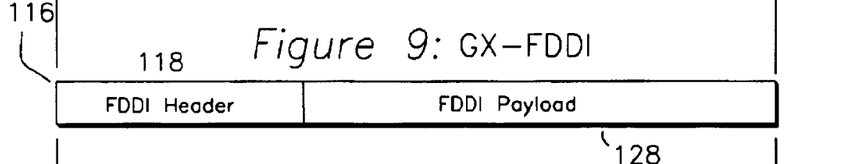
FIG. 9 shows the case where the GX payload is an FDDI packet.

FIG. 9 shows the GX payload 56 comprising an FDDI format 116, including FDDI header 118, and FDDI payload 128.

Figure 10:
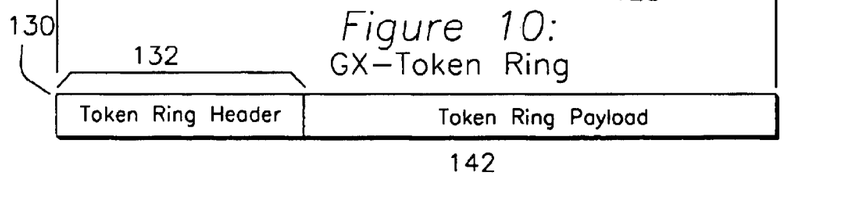
FIG. 10 shows the case where the GX payload is a Token Ring packet.

FIG. 10 shows the GX payload 56 comprising a Token Ring format 130 including a Token Ring header 132 and Token Ring payload 142.

Each of the GX payloads 56 as described in FIGS. 6,8,9, and 10 is associated with a particular GX header type field value 64. The objective of field value 64 is to provide knowledge of the type and format of the associated GX payload data. It is clear to one skilled in the art that it is possible to add support for additional payload format types through the assignment of header type 64 beyond those discussed here, and the use of specific GX payload types described herein are not intended to limit the application of field types to only these examples used for illustration.

Figure 11:
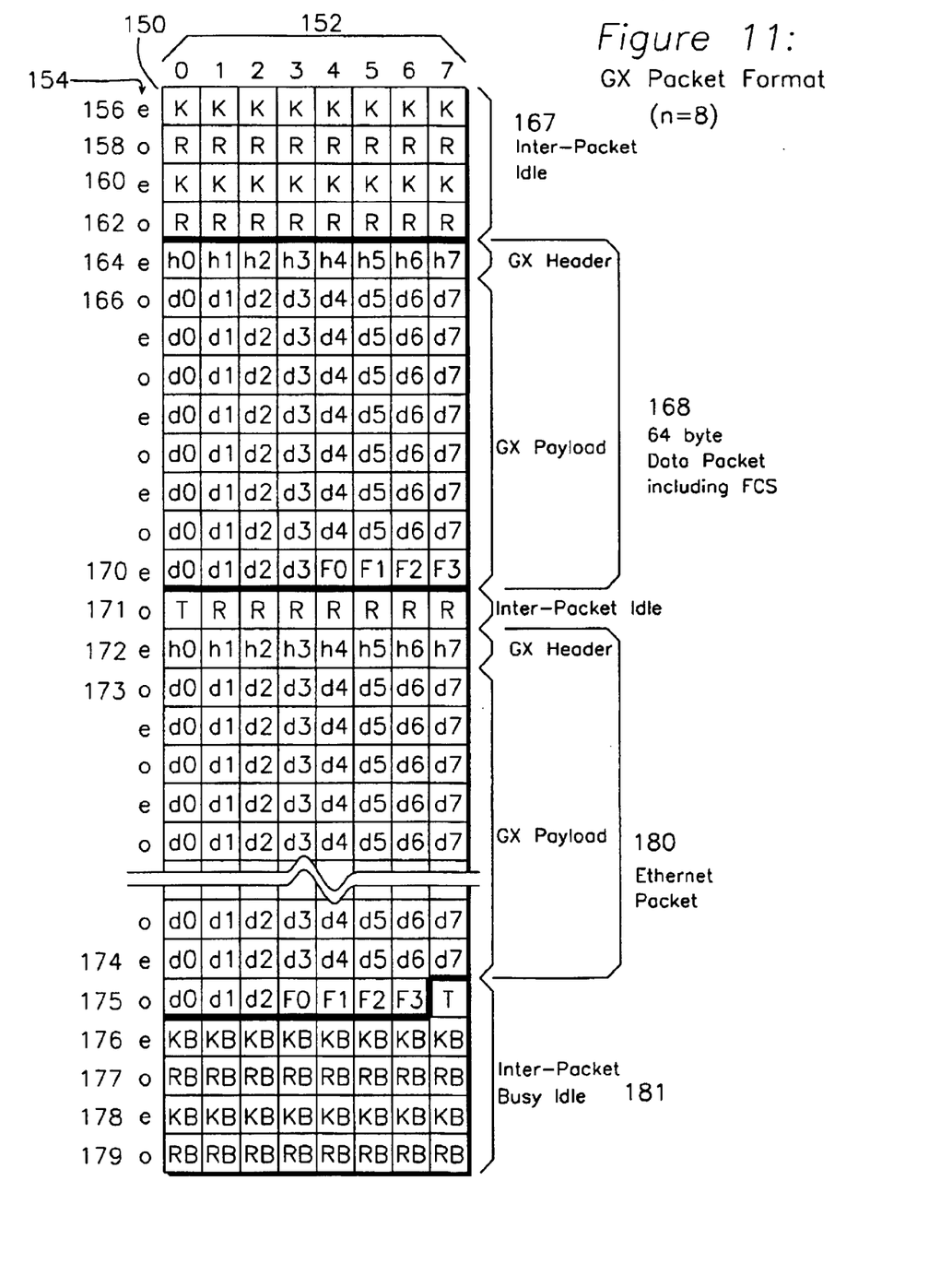
FIG. 11 shows the GX packet format where the data is transmitted and received across 8 data lanes.

FIG. 11 shows the GX packet format for the case where the number of data lanes 152 n=8. Data from the GX packet 52 is distributed across 8 data lanes identified by the columns 0 through 7 of 152. Time intervals are identified alternately as odd (o) and even (e) as shown in column 154. K symbols are sent during even cycles, and R symbols sent during odd cycles, as represented by rows 156 and 158, respectively. This alternating sequence continues during inter-packet idle time 167, serving as the variable length. inter-packet interval 74. The GX packet 168 comprises GX header 164 and GX payload, starting at row 166, and ending at row 170. Data is instantaneously transmitted from column 0 through column 7, row by row, until the final 4 byte FCS 58 is sent, as noted by F0, F1, F2, and F3 in row 170, which is the end of the GX packet 52. The T symbol of row 171 indicates the end of transmission, and the remainder of the data lanes are filled with odd idle symbol R. The following Ethernet packet 180 of FIG. 11 comprises GX header 172 followed by data, the FCS, and an END symbol in rows 173 through 175. If the receiver for the link were busy, the BUSY_IDLE symbols KB and RB would be sent during the inter-packet period 181 from END symbol T on column 7 of line 175 followed by BUSY_IDLE symbols on line 176 through 179.

The algorithm used in transmission is as follows:

1) Packet data is divided across n data lanes.

2) Upon startup, each of data lanes 0 though n−1 sends idle symbols alternately coded K during even cycles, and R during odd cycles. The number of these initial startup idle packets is $N_{idle}$, and their purpose is to gain synchronization of the receiver prior to sending data. If the receiver of the link is busy, and unable to receive additional data, it signals this with the code KB during even cycles, and RB during odd cycles.

3) When a data packet is ready for transmission, a header is sent including the start symbol S on the first data lane, and remainder of the header on the remaining data lanes. The GX header includes information which declares the format of the packet data of the GX payload.

4) Across all data lanes, data is sequentially sent up to, but not including, the last lane-wide data transfer.

5) On the last lane-wide data transfer, the end of packet symbol T is sent on the data lane following the last valid data byte, and the balance of thedata lanes is filled with K for even cycles, or R for odd cycles. If the receiver for the link is unable to receive new data, KB is sent during even cycles, and RB is sent during odd cycles.

6) Until the availability of the next complete packet for transmission, the symbol K is sent during even cycles and R is sent during odd cycles across all data lanes. During the time the receiver is unable to receive new data, KB is sent during even cycles, and RB is sent during odd cycles. Additionally, a sequence of at least 32 bytes is sent at least once every nelasticity data bytes to accommodate clocking differences between systems. The value of $n_{elasticity}$ is determined by the difference in clock frequency between systems, and is typically $2^{15}$ bytes or greater.

In the example of FIG. 11, a link is initialized with the transmission of a minimum number of idle patterns which are transmitted by all data lanes during even cycles as the symbol K andduring odd cycles as the symbol R. This idle pattern continues a minimum time to enable symbol synchronization in the receiver. This enables the receiver to acquire lock, and the symbol decoders to operate for an interval on synchronization data, as well as to decode their separate version of odd/even, which the receiver will need for symbol decoding. In this example, a 64 byte Ethernet packet 168 is sent, comprising header 164, and data rows 166 through 170, followed by END symbol T and IDLE_ODD R symbols of row 171. Since the last data symbol occurs on the final data lane of 170, data row 171 has the END symbol T sent on data lane 0, and the remainder of the data lanes carry the IDLE_ODD symbol R. The next packet sent is Ethernet packet 180, comprising header 172, and data 173 through 175. In this case, the END symbol is sent on the last data lane during the last data transfer 175, which is data lane 7 for the present case of n=8.

Figure 12:
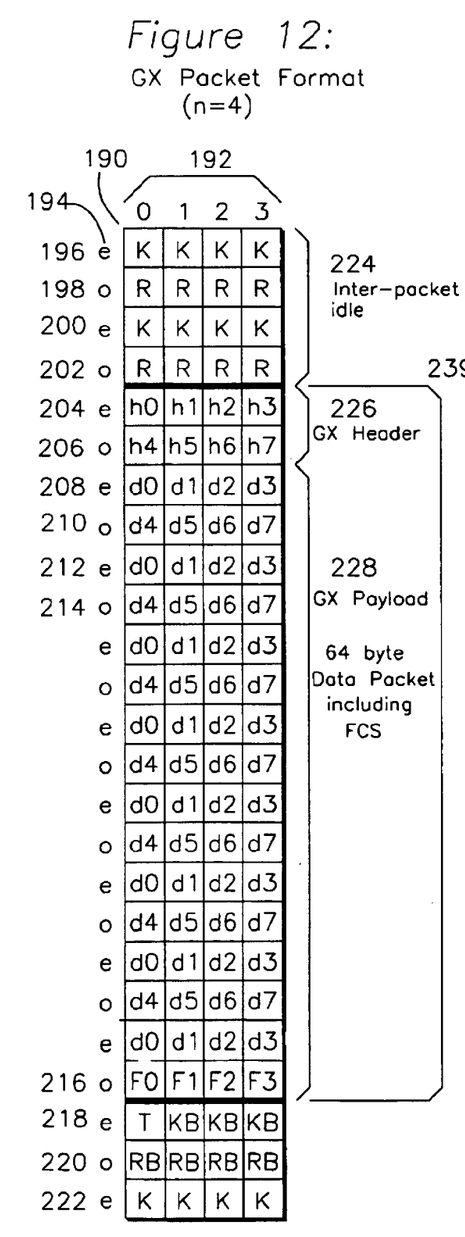
FIG. 12 shows the GX packet format where the data is transmitted and received across 4 data lanes.

FIG. 12 shows the GX packet format for the case where the number of data lanes n=4. As before, the data is presented to data lanes 192, and the frame comprises inter-packet idle pattern 224 which alternates during odd and even cycles of 196, 198, 200, and 202. The GX header is now sent over two cycles starting with the Start symbol in H0 of 204, followed by the balance of the header in second cycle 206. The GX payload 228 is sent from cycles 208 through FCS 216 and END symbol T in line 218. Cycles 218 and 220 show a busy receiver, as BUSY_IDLE_EVEN KB and BUSY_IDLE_ODD RB are sent. The following cycle 222 signals an even cycle with the receiver no longer busy.

Figure 13:
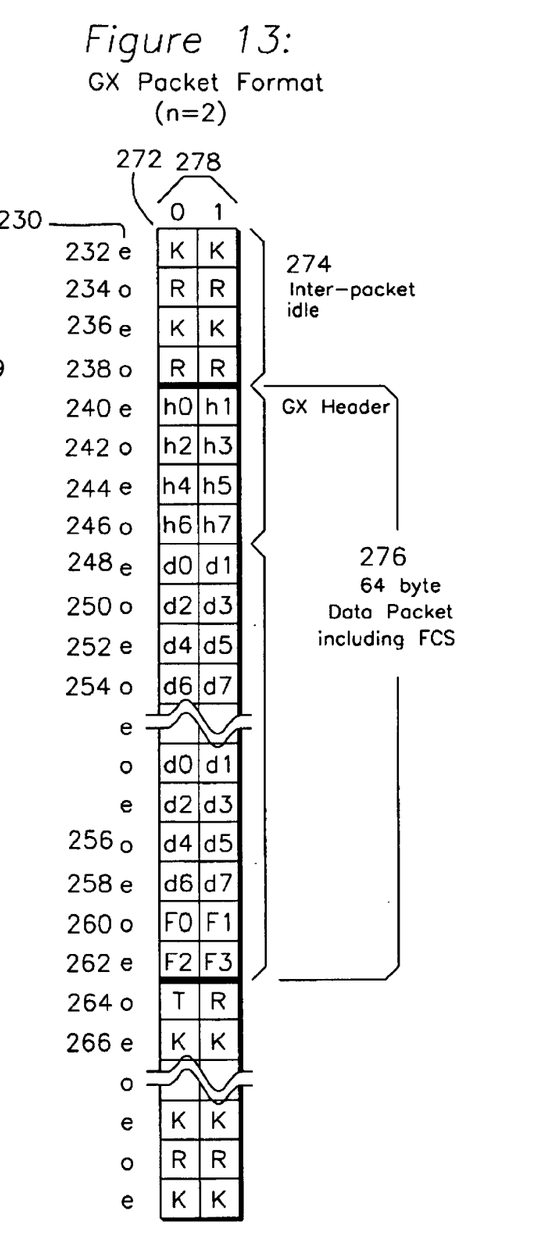
FIG. 13 shows the GX packet format where the data is transmitted and received across 2 data lanes.

FIG. 13 shows the GX packet format for the case where the number of data lanes n=2. For this case, the GX header and GX data are distributed across the available data lanes, as shown.

Figure 14:
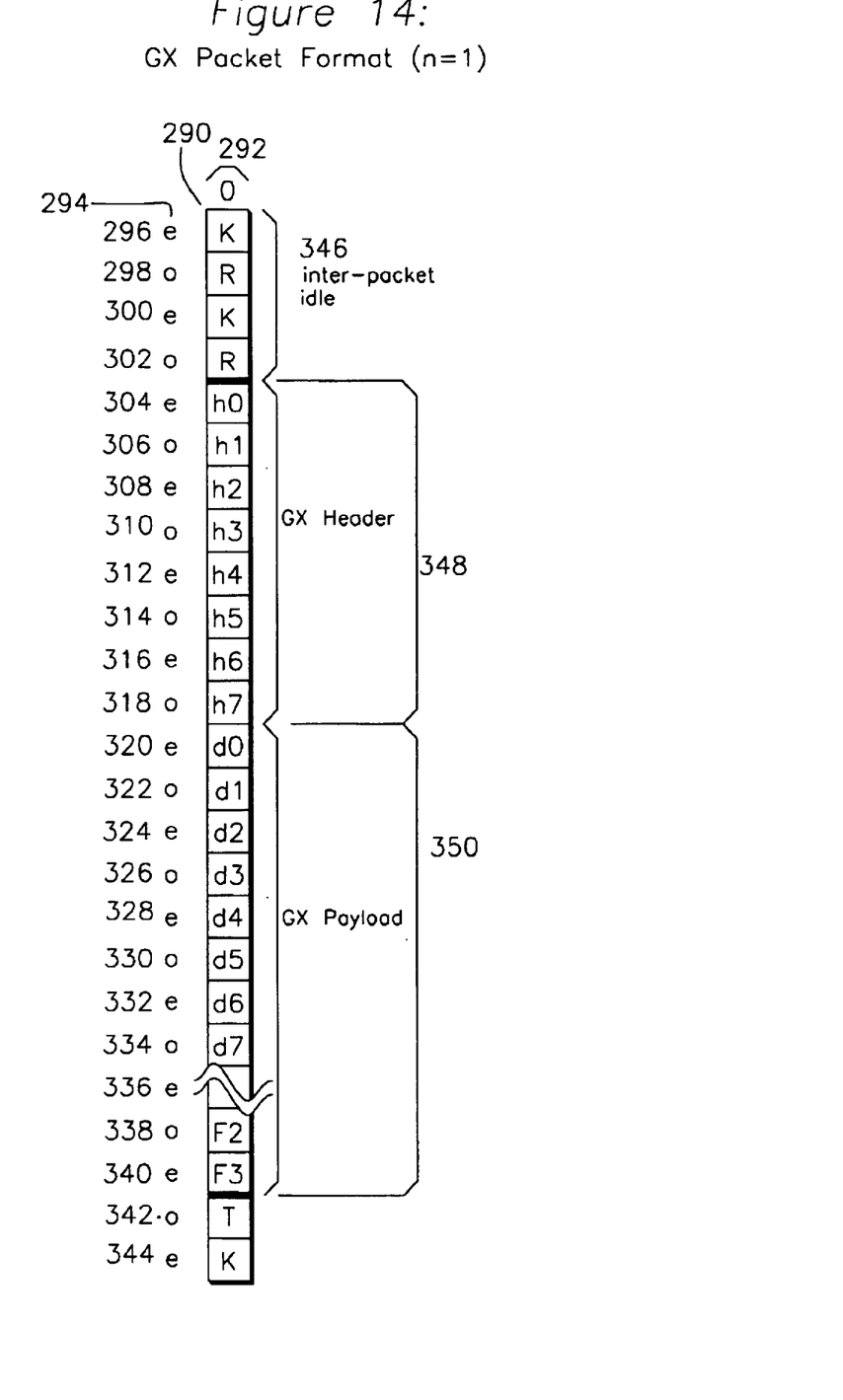
FIG. 14 shows the GX packet format where the data is transmitted and received across 1 data lane.

FIG. 14 shows the serial case of n=1, where only one. data lane is used. As before, IDLE_ODD and IDLE_EVEN cycles are shown during the inter-packet idle interval 346, and the GX header is sent over 8 cycles as shown in 348, and the GX payload is sequentially sent from 320 through 340, followed by the END symbol T in row 342.

It is clear to one skilled in the art that in the previous illustrations for various numbers of byte lanes that the assignment of a particular data byte stream to a particular byte lane is arbitrary, and the sequential assignment shown herein is for illustration only.

Examining the header for each of the previous FIGS. 11, 12, 13, and 14, FIG. 3*b* shows the header format typically used by each of the previous examples. For the present example, where 8 data lanes are used, the header 54 comprises the following bit fields:

an 8 bit START symbol 60;

a single bit BPDU field 62;

a 7 bit type field 64 indicating the type of data carried (Ethernet, Token Ring, FDDI, ATM, IP, etc);

a 12 bit VLAN field;

a 3 bit priority field;

a 1 bit reserved field;

a 32 bit application specific field 68 for future expansion.

Alternatively, application specific field 68 may contain information that is specific to a particular protocol. The It information in the GX header 54 is generally useful to the router or switch in the extraction of early information about the nature and handling of the information to be processed. The type field 64 is used to declare whether the payload data is Ethernet, ATM, or some other type, and the data that follows is used in a context specific to the type declaration 64. In the particular example, a BPDU bit 62 can be set which ensures that BPDUs (Bridge Protocol Data Unit) used for Spanning. Tree Protocol described in IEEE 802.1D properly arrive. Often in networks that are congested because of a reconfiguration event (equipment that has recently failed, or is being added or removed), BPDUs without such priority treatment and which are essential to the reconfiguration of the network are lost, or blocked from transmission. By including this information in the header, they may be granted priority over ordinary data packets.

Figure 15:
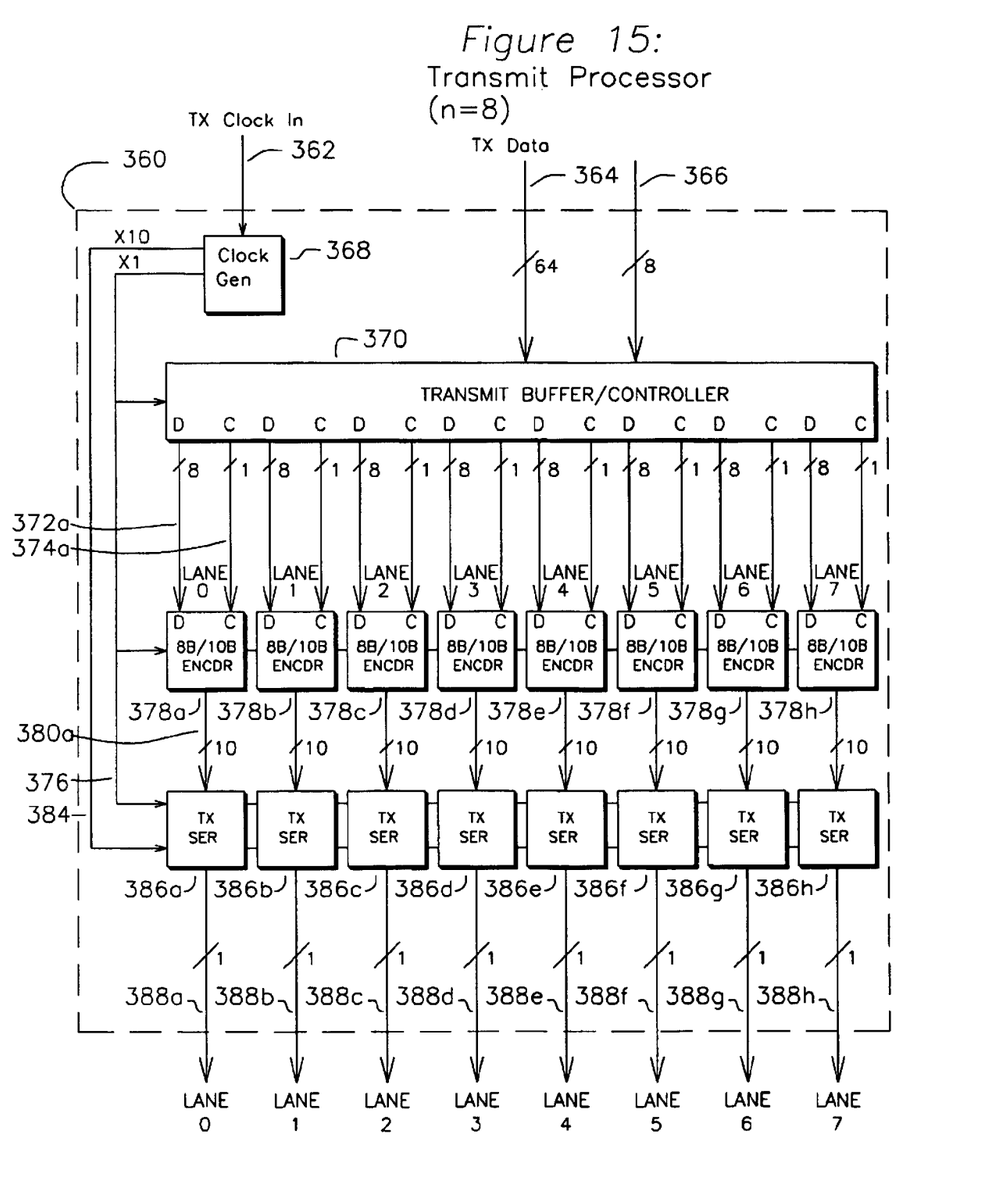
FIG. 15 is an 8 data lane transmit processor for the packet of FIG. 11.

FIG. 15 shows a block diagram of the transmit processor 360. Input packets arrive via input interface 364 to transmit buffer/controller 370 accompanied by control/data bits 366. Data is arranged in byte order across output ports 0 through n−1, shown for the instance where n=8 having data lanes 0 through 7. In addition to data outputs, the transmit buffer/controller also outputs control information for each data lane. Each data lane is controlled by a single control signal such as 374a for lane 0, and accompanied by transmit data such as 372a. During the times that control symbols are emitted, such as START, IDLE, IDLE_BUSY, and END, the control input is asserted true, and the associated 8 bit data indicates which special 10B control symbol should be emitted. During the time that the control signal is not asserted, the incoming data is encoded using the prior art 8B/10B coding rule, as will be described later. When IDLE cells are to be output, the encoders across all data lanes are set to alternate between IDLE_EVEN and IDLE_ODD. During the first cycle of a packet transmit, the transmit buffer/controller outputs START on control lane 0. Lanes 1 through 7 carry the balance of the GX Header information. During the last cycle of transmit, all of the lanes up to the final data byte have control signals set to DATA, and data is sent on these data lines. The following lane has its control and data lines set for END, and the remaining lanes have their control and data lines set for IDLE_EVEN, or IDLE_ODD, depending on whether they occur on an even or odd cycle. Encoders 378a through 378h accept this control signal accompanied by data. During the times the control input is DATA, this data is encoded from 8B to 10B as described in the 8B/10B coding scheme of U.S. Pat. No. 4,486,739. During the times the control input is CONTROL, the data input is interpreted to produce control codes such as IDLE_EVEN, IDLE_ODD, START, and END. The 10B encoded data is input to transmit serializers 386a through 386h, and are output as serial data organized by data lanes 388a through 388h. These outputs are typically fed through an optical or electrical link to a receive processor. Transmit clock source 368 provides a clock 376 for the transmit buffer/controller 370 and optionally the encoders 378a through 378h at the data rate in use. For a system sending 10 Gb/s of data, TX Data 364 would clock 8 bytes of data at a rate of 156.25 Mhz into encoders 378 and serializer 386 via parallel clock 376. After encoding the data to a 10 bit width 380a, the serializer output stages 386 are clocked at 1.5625 Ghz. It is understood to one skilled in the art that the actual clocking speed of the interface as provided by generator 368 may be any frequency, as long as the serializer clock rate and transmit buffer output clocking rate are matched in throughput. Additionally, the encoders may be optionally clocked on input or output, or not at all, and the serializers may be optionally clocked on input or output, although best performance may be seen with clocking at each stage.

Figure 16:
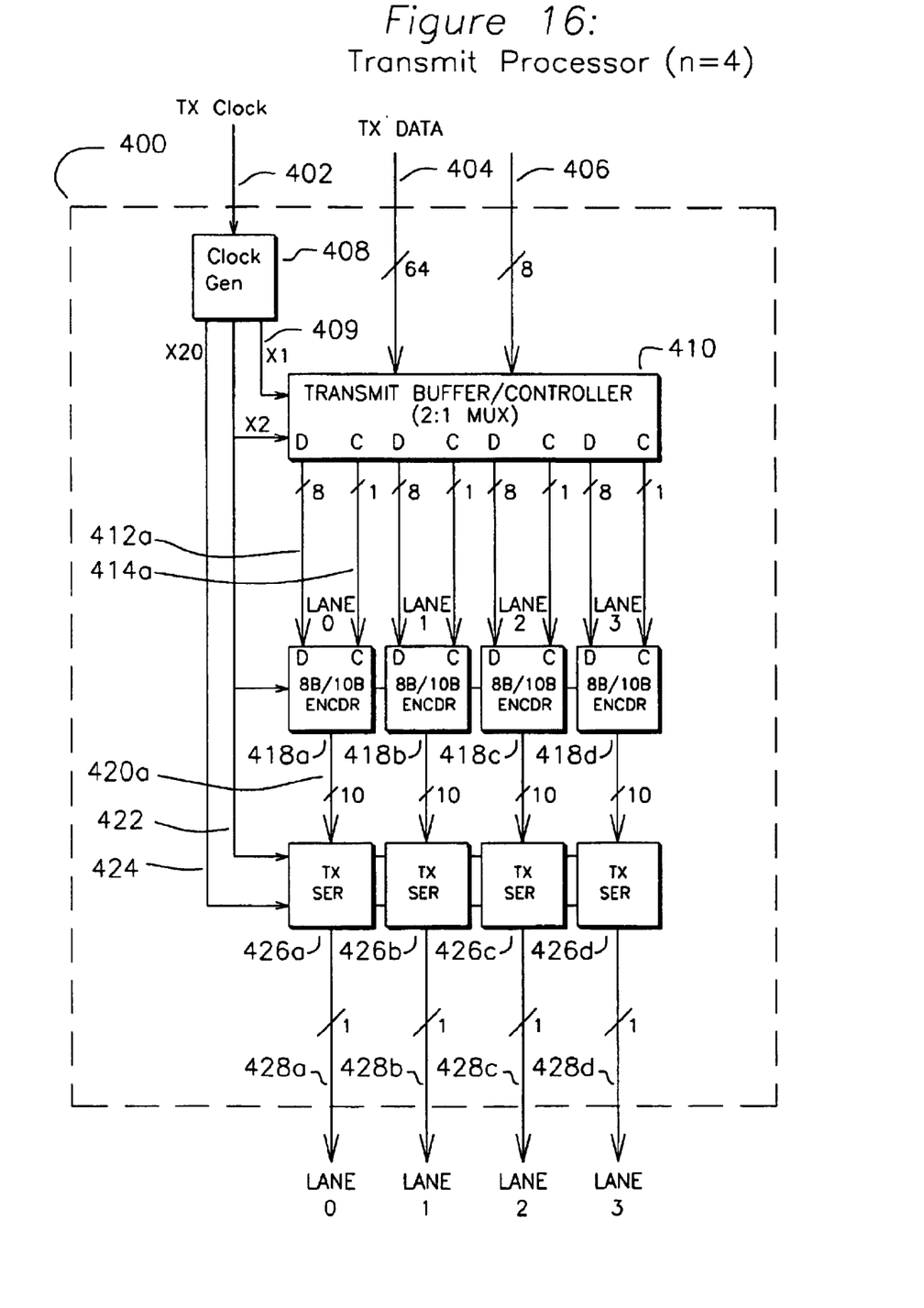
FIG. 16 is a 4 data lane transmit processor for the packet of FIG. 12.

FIG. 16 shows an alternate transmit processor for the case where the number of data lanes n=4, while the TX data input 404 rate remains constant. Transmit buffer 410 may accept 8 byte wide inputs on interface 404 accompanied by control/data bits 406, and perform a 2:1 multiplexing to distribute this input data and control across the 4 data lane wide interface. The operation of other elements of FIG. 16 is the same as the earlier FIG. 15, with the exception of clock generator 408, which for a 10 Gb/s input rate 404, is now clocking in TX data 404 with a 156.25 input clock 409, and is using a 312.5 Mhz input clock for control 414 and data 412 on lanes 0 to 3 to the encoders 418 and serializer inputs 426. The serializer 426 outputs are clocked using a 3.125 Ghz clocking rate 424. The output of this transmit processor is the 4 data lane data stream of FIG. 12. As is clear to one skilled in the art, many other such modification may be made to the transmit processor, including changing the number of data lanes to any value of one or more, whereby the level of multiplexing of the transmit buffer/controller 410 is related to the width of the input packet bus divided by the number of data lanes on the output side of the buffer/controller. For the case where n=1 and a 64 bit packet input is afforded, the input would be multiplexed 8:1, and only data lane 0 would be implemented, producing the output described in FIG. 14. For n=1, the transmit buffer would clock 8 byte data in at 156.25 Mhz, and send a single stream to the encoder, clocked into and out of the serializer at 1.25 Ghz. The serializer rate 422 would be 12.5 Ghz. As indicated earlier, any clocking rate could be used, as long as the throughputs are matched between stages.

Figure 17A:
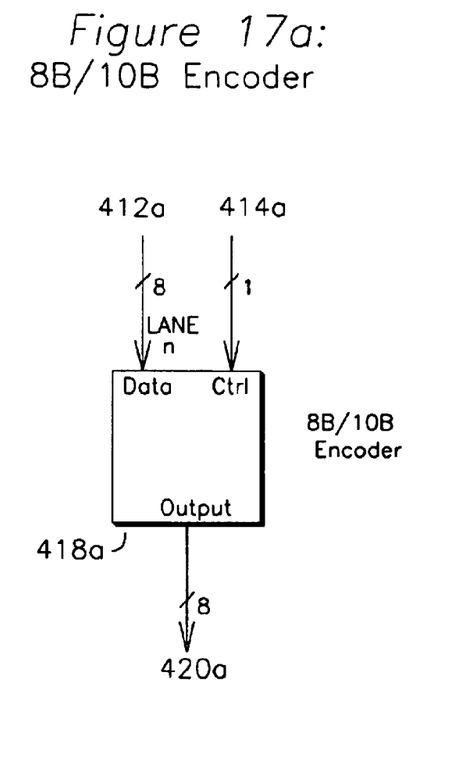
FIG. 17a shows the 8B/10B encoder.
Figure 17B:
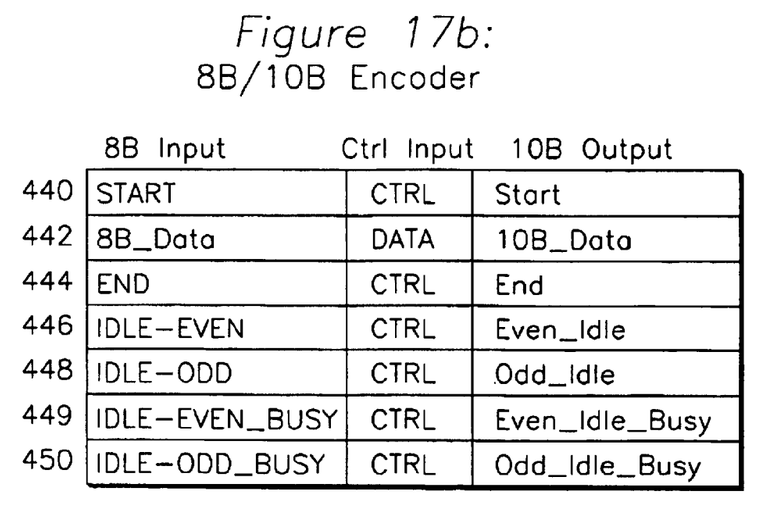

FIG. 17a shows the 8B/10B encoder in further detail. Data input 412a and control input 414a produce output 420a which is 10B encoded depending on the data and control inputs, as shown in FIG. 17b. For the control input 414 set to DATA,. line 442 shows 8 bit input data directly encoded into 10 bit output data according to the method of U.S. Pat. No. 4,486,739. Line 440 shows the start transaction, wherein an 8B START input 412 and the control input 414 set to CTRL outputs a Start symbol selected from the available and unused 10B encodings. Similarly, lines 444, 446, 448, 449, and 450 show the control input 414 set to CTRL while END, IDLE_EVEN, IDLE_ODD, IDLE_EVEN_BUSY, and IDLE_ODD_BUSY are input as 8B data, which causes unique 10B symbols to be emitted which are reserved from the available and unused 10B encodings. There are many different such unique and unused 10B codings, and the best selections are made on the basis of running disparity and hamming distance from other codes. In the best mode the codings (in 10B descriptive format) are

START K27.7

END K29.7

IDLE_EVEN K28.5

IDLE_ODD K23.7

IDLE_EVEN_BUSY K28.1.

IDLE_ODD_BUSY K28.0.

When the receive processor for this end of the link has a full receive buffer or is no longer capable of receiving additional data, it signals this to the transmitter on the opposite end of the link by emitting EVEN_IDLE_BUSY or ODD_IDLE_BUSY, as shown in lines 449 and 450.

Figure 18:
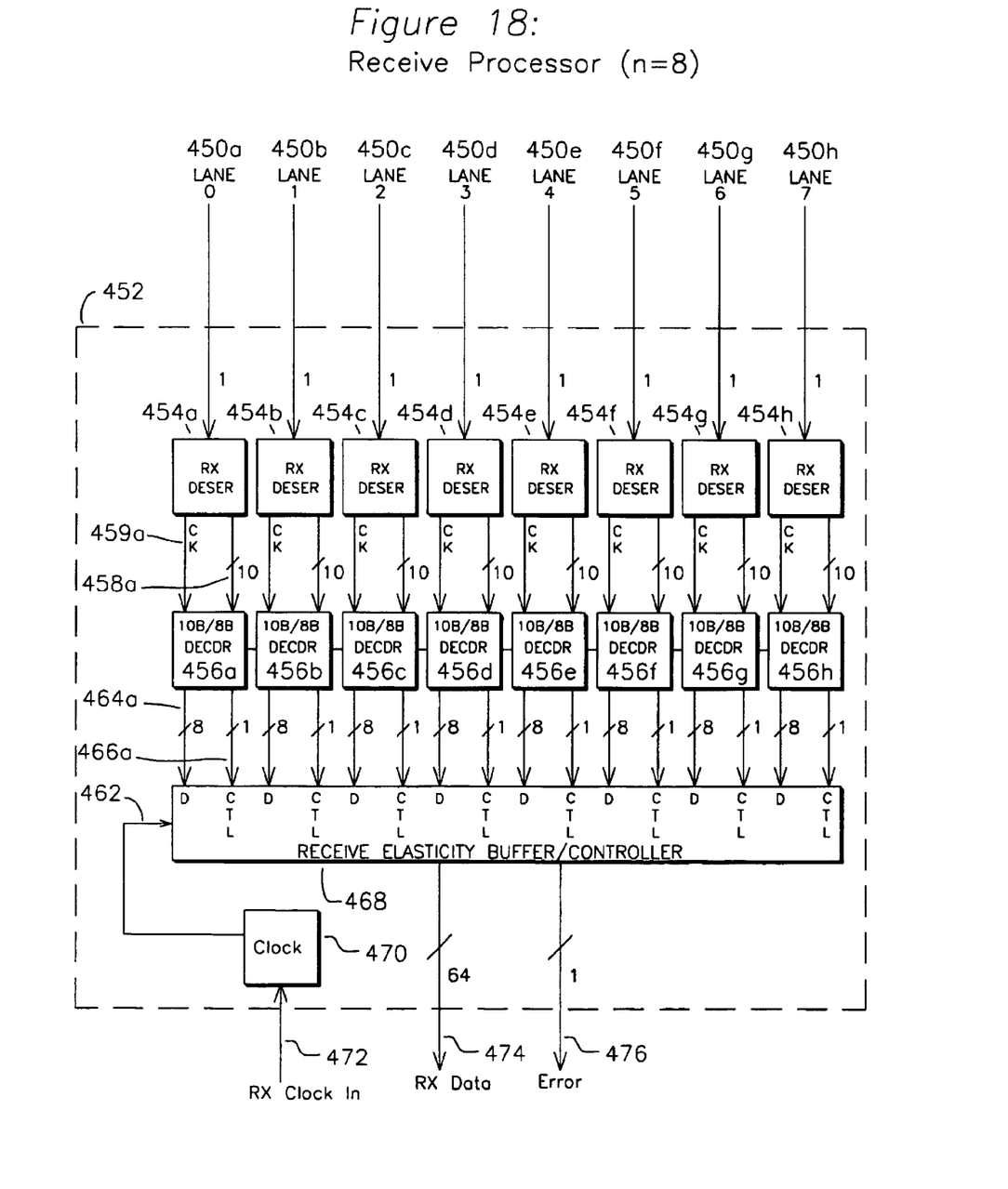
FIG. 18 is an 8 data lane receive processor for the packet of FIG. 11.

FIG. 18 shows the receive processor 452. Input data is applied as serial streams organized by data lane, shown as 450a through 450h. This data is applied to the receive deserializers 454a through 454h, which output 10 bit wide streams of data 458a through 458h, organized by data lane. These 10B streams are applied to the 10B/8B decoders 456a through 456h, which decode 8 bit data 464a through 464h and control information 466a through 466h, shown for lane 0 as 464a and 466a respectively, and repeated identically for all decoders 456a through 456h. Receive elasticity buffer/controller 468 accepts these inputs and organizes packet data to transfer to output port 474 based on receiving a control input 466a asserted with the data input 464a having the value START on lane 0, and header data on the remaining lanes 464b and 466a through 464h through 466h, followed by the data packet, followed by the control signal 466 asserted accompanied by data 464 having the value END on the appropriate data lane. Thereafter IDLE signals are received. The controller is able to extract a variety of error conditions, such as START appearing on a data lane other than 0, an improperly formed IDLE_EVEN, IDLE_ODD, IDLE_EVEN_BUSY, IDLE_ODD_BUSY or END transaction, and the like. These error conditions are signaled through error output 476. Each deserializer may locally recover a clock 459 for use in clocking the decoder 456. The receive elasticity buffer/controller also serves to isolate the clock domains between the input clocking rate controlled by the receive data speed whereby control 466 and data 464 signals enter the controller at rates determined by the link far-end sender and buffered data 474 is clocked out of the receive elasticity buffer by local system clock 472. While the receive clock domain boundary is shown in the elasticity buffer 468, it is clear to one skilled in the art that this boundary could be located anywhere in the receive processor. In the example shown in FIG. 18, data is clocked into decoders 456a–456h by recovered clock 459, which is locked to the frequency of the sending source using clock recovery methods well known in the art. Data is clocked out of the receive buffer by local clock 462, which is derived from system clock 472.

Figure 19:
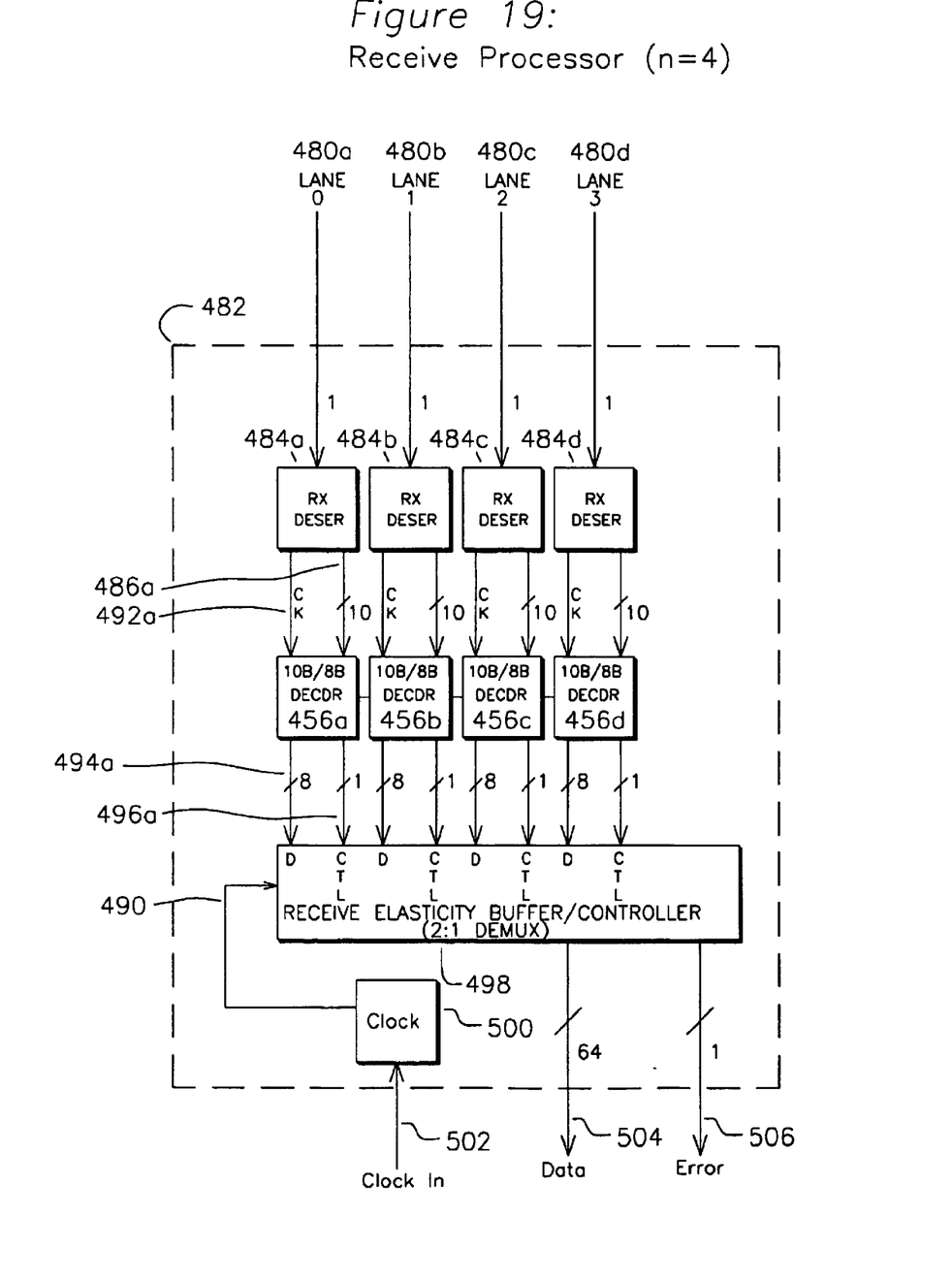
FIG. 19 is a 4 data lane receive processor for FIG. 12.

FIG. 19 shows the case where the receive processor has the number of data lanes n=4. This operates analogously to the receive processor of FIG. 18, except that the data rate of data presented to the receive buffer/controller on inputs 494 and 496 is doubled.

Figure 20A:
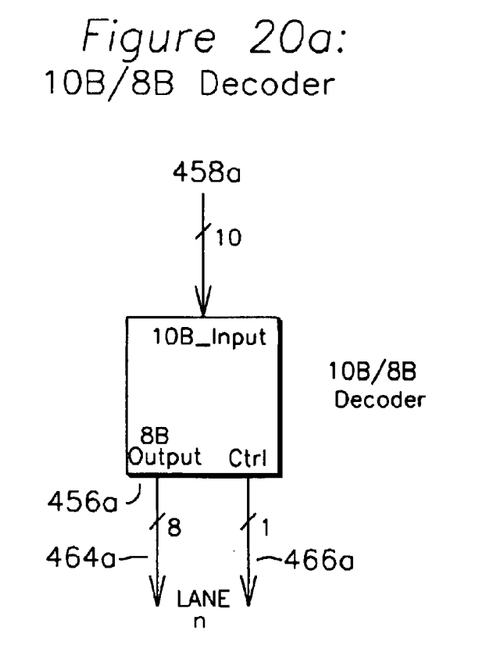
FIG. 20a shows the 10B/8B decoder.
Figure 20B:
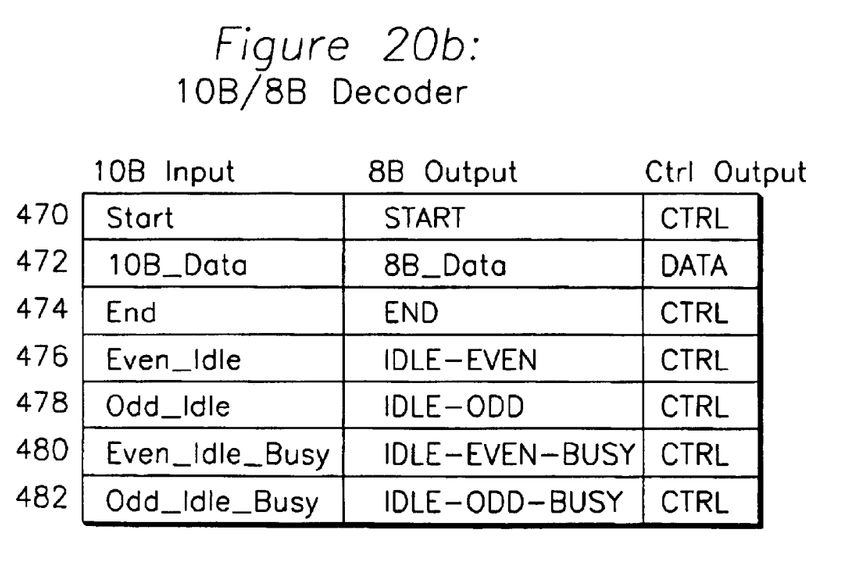

FIG. 20a shows the 10B/8B decoder. 10 bit parallel input 458a is converted to 8 bit output data 464a, and 1 bit control 466a. FIG. 20b shows the cases 470, 474, 476, 478, 480, and 482 for Start, End, Even_Idle, Odd_Idle, Even_Idle_Busy, and Odd_Idle_Busy respectively. Case 472 shows 10B input data decoded into 8B output data, and the control output signal asserted as type DATA.

In the manner described, data packets may be furnished to a controller, encoded into data lanes, serialized, and transmitted as clock-encoded data. These serial streams of byte-organized data may remotely deserialized, decoded, and re-assembled back into data packets for handling. Additionally, header information may optionally be prepended such that information required by the receiving equipment may be easily retrieved during the interval the data packet is being received. The above description of the high speed transmit and receive processors has been drawn to a particular implementation to afford a complete understanding of the invention as practiced in its best mode. Although the invention has been described through the best mode case, it is clear to one skilled in the art that there are many other ways of implementing the described invention. For example, while the figures describe receive and transmit processors having n=1 to n=8 data lanes, it is clear that an arbitrary number of channels would operate in the same manner, and that the parallel paths and codings do not need to be based on 8-bit bytes. Further, while the encoding and decoding of symbols is based on the standard method of 8B/10B coding of U.S. Pat. No. 4,486,739, other coding/decoding methods could be used. The transmit buffer/controller is shown as generating control signals which indicate the time that particular codes are to be emitted by the encoders, functions which could be performed by a separate controller. While the clocking rates have been chosen to illustrate a 10 Gb/s data rate for exemplar purposes, no such clock speed limitation should be inferred in the present invention, which offers the advantages described for any data rate or clocking speed.

We claim:

1. A process for transmitting a packet having a header and variable length payload on a communications interface comprising the steps:
   a first step of sending IDLE symbols until a synchronization time has passed;
   a second step of sending said packet header, said header including a START symbol and TYPE field identifying the format of said payload including an FCS sequence;
   a third step of sending said variable length payload;
   a fourth step of sending a terminator including an END symbol indicating end of transmission of said packet;
   a fifth step of sending IDLE symbols if next said packet is not ready to transmit, or returning to said second step if said next packet is ready to transmit;
   where said header TYPE field includes one or more values which indicate that said variable length payload may vary in length from a minimum length to a maximum length;
   where said TYPE field uniquely identifies said payload format, said format including Ethernet packets, native IP packets, ATM cells, and control packets;
   and said header includes declaration fields for BPDU, PRIORITY, VLAN_ID, and an application specific field.

2. The process of claim 1 wherein said BPDU field is 1 bit in size.

3. The process of claim 1 wherein said PRIORITY field is 3 bits in size.

4. The process of claim 1 wherein said VLAN_ID field is 12 bits in size.

5. The process of claim 1 wherein said application specific field is 32 bits in size.

6. The process of claim 1 wherein said header comprises, in sequence, said START symbol, said BPDU field, said TYPE field, said PRIORITY field, said VLAN_ID field, and said application-specific field.

7. A process for transmitting a packet having a header and variable length payload on a communications interface comprising the steps:
   a first step of sending IDLE symbols until a synchronization time has passed;
   a second step of sending said packet header, said header including a START symbol and TYPE field identifying the format of said payload including an FCS sequence;
   a third step of sending said variable length payload;
   a fourth step of sending a terminator including an END symbol indicating end of transmission of said packet;
   a fifth step of sending IDLE symbols if next said packet is not ready to transmit, or returning to said second step if said next packet is ready to transmit;
   wherein a plurality n of data lanes carry said header, said payload, and said END symbol;
   wherein said second step comprises transmitting said header across said n data lanes until all said header information has been sent;
   said third step comprises transmitting said variable length payload, wherein during a final payload cycle, said payload ends on a data lane m;
   for the case where m<n, said fourth step includes sending on said final payload cycle said END symbol on lane m+1, and said IDLE symbol on any available data lanes m+2 through n;
   for the case where m=n, said fourth step comprises sending said END symbol on data lane 0, and said IDLE symbol on data lane 1 through said data lane n.

8. The process of claim 7 where n=8.

9. The process of claim 7 where n=4.

10. The process of claim 7 where n=2.

11. The process of claim 7 where n=1, and
   said second step comprises transmitting said header on said data lane until all said header information has been sent;

said third step comprises transmitting said variable length payload on said data lane, said fourth step comprises sending said END symbol on said data lane.

12. The process of claim 7 wherein at least one said data lane comprises a serial electrical link.

13. The process of claim 7 wherein at least one said data lane comprises a parallel electrical link.

14. The process of claim 7 wherein at least one said data lane comprises one or more serial or parallel optical links.

15. The process of claim 7 wherein said first step comprises the transmission of said IDLE symbols on all said n data lanes.

16. The process of claim 15 wherein said IDLE symbols are transmitted across all said n data lanes when there is no said packet data available to transmit.

17. The process of claim 16 wherein successive data lane cycles toggle successively between the states odd and even.

18. The process of claim 17 wherein said IDLE symbols transmitted comprise IDLE_ODD symbols during said odd state, and IDLE_EVEN symbols during said even state.

19. A communication interface comprising n data lanes, said interface sequentially transmitting a header distributed across a plurality of said data lanes, a variable amount of payload data distributed across a plurality of said n data lanes;

said header includes transmitting a START symbol on first said data lane, and the transmission of said payload data is followed by an END symbol on at least one said data lane;

said payload data includes transmitting data across said n data lanes up to data lane m, where m<=n.

20. The communication interface of claim 19 wherein if said m<n, said END symbol is transmitted on data lane m+1, and if said m=n, said END symbol is transmitted on data lane 0.

21. The communication interface of claim 20 wherein each said data lane is identified by the alternating states of odd and even cycles.

22. The communication interface of claim 21 wherein said IDLE symbol is IDLE_EVEN during said even cycle and IDLE_ODD during said odd cycle.

23. The communication interface of claim 22 wherein all said data lane 0 through data lane n transmit IDLE_EVEN during said even cycles, and IDLE_ODD during said odd cycles.

24. The communication interface of claim 23 where IDLE_EVEN or IDLE_ODD are transmitted after said END symbol at least once during every interval $t_{elasticity}$.

25. The communication interface of claim 24 where $t_{elasticity} = T_{transmit} * \text{clk\_offset}$, where $T_{transmit}$=time since last IDLE transmittal clk_offset=(maximum Transmit clock rate−minimum receive clock rate)/(minimum receive clock rate).

26. A transmit processor comprising:

a busy input;

a transmit buffer/controller accepting packet data comprising a header and a payload as input, arranging said packet data into a plurality n of data lanes, and delivering to each said data lane unencoded transmit data and a control signal, whereby when said control signal is asserted, said unencoded transmit data includes at least one of the values START, END, IDLE, IDLE_BUSY and when said control signal is not asserted, said transmit data includes said packet data;

a plurality n of transmit encoders, each having an input and an output, each of said transmit encoder inputs uniquely coupled to one of said transmit buffer/controller data lanes, said transmit encoder input comprising said unencoded transmit data and said control signal, said transmit encoder output producing a unique encoded output value for each said unencoded transmit data value when said control signal is not asserted, and producing a unique encoded output values for each unencoded transmit data START, END, IDLE, and IDLE_BUSY when said control signal is asserted;

a plurality n of transmit serializers, each having an input uniquely coupled to one of said transmit encoder outputs, said transmit serializers outputting a single serial stream of data from said transmit serializer input;

wherein said transmit buffer/controller sends said header by outputting on said first data lane the asserted said control and said unencoded transmit data START, and simultaneously outputs the remainder of said header on said remaining data lanes accompanied by said unasserted control signal for each said data lane, thereafter and on each successive cycle said transmit buffer/controller distributes said payload data on all said data lanes and sends it to said transmit encoder with said unasserted control signal accompanied by said payload data, until unsent said payload data can not fully span said n data lanes, thereafter said transmit buffer/controller sends the last said payload data on each said data lane with associated said control signal unasserted, with following said data lane having said control signal asserted accompanied by said unencoded data END, and the remaining said data lanes having said control signal asserted accompanied by said unencoded data IDLE.

27. The transmit processor of claim 26 wherein each said transmit cycle has the state odd or even, and said IDLE comprises an IDLE_EVEN sent on said even cycles or an IDLE_ODD sent on said odd cycle.

28. The transmit processor of claim 27 wherein each successive transmit cycle alternates between odd or even, said IDLE_EVEN is sent during even cycles, and IDLE_ODD is sent during odd cycles.

29. The transmit processor of claim 27 wherein said IDLE comprises an IDLE when said busy input is not asserted, or a IDLE_BUSY when said busy input is asserted.

30. The transmit processor of claim 29 wherein said IDLE comprises an IDLE_EVEN_BUSY during said even cycle when said busy input is asserted, an IDLE_EVEN during said even cycle when said busy input is not asserted, an IDLE_ODD_BUSY during said odd cycle when said busy input is asserted, and an IDLE_ODD during said odd cycle when said busy is not asserted.

31. The transmit processor of claim 30 wherein said transmit encoder comprises an 8B/10B encoder.

32. The transmit processor of claim 31 wherein the number of said data lanes n=8.

33. The transmit processor of claim 31 wherein the number of said data lanes n=4.

34. The transmit processor of claim 31 wherein the number of said data lanes n=2.

35. The transmit processor of claim 31 wherein the number of said data lanes n=1.

36. The transmit processor of claim 31 wherein the 10B coding value for symbol START is K27.7.

37. The transmit processor of claim 31 wherein the 10B coding value for symbol END is K29.7.

38. The transmit processor of claim 31 wherein the 10B coding value for symbol IDLE_EVEN is K28.5.

39. The transmit processor of claim 31 wherein the 10B coding value for symbol IDLE_ODD is K23.7.

40. The transmit processor of claim 31 wherein the 10B coding value for symbol IDLE_EVEN_BUSY is K28.1.

41. The transmit processor of claim 31 wherein the 10B coding value for symbol IDLE_ODD_BUSY is K28.0.

42. The transmit processor of claim 31 wherein the 10B coding values for the symbols START, END, IDLE_EVEN, IDLE_EVEN_BUSY, IDLE_ODD, and IDLE_ODD_BUSY have unique values when compared to any coded 10B data value.

43. The transmit processor of claim 42 wherein the 10B coding values for the symbols START, END, IDLE_EVEN, IDLE_EVEN_BUSY, IDLE_ODD, and IDLE_ODD_BUSY are separated by hamming distance 2.

44. A receive processor comprising:
   a plurality n of receive deserializers each accepting as input a serial stream of encoded data and outputting deserialized encoded data;
   a plurality n of receive decoders each uniquely coupled to and accepting as input said deserialized encoded data and providing as output decoded data and decoded control signals, said decoded data including at least on of the values START, END, and IDLE when said control signal is asserted;
   a receive buffer/controller for the formation of data packets, said buffer/controller having a plurality n of inputs, each uniquely coupled to said decoded data and said decoded control, said buffer/controller having a busy output and a data output, said receive buffer/controller awaiting START on said first lane with associated control signal asserted, and storing a header on the remaining said data lanes when said START is received, and transferring to said data output all subsequent data while said control signal is unasserted for all said data lanes, and upon receipt of said END accompanied by the assertion of said associated control signal on any data lane, transferring said decoded data to said data output all said received data up to but not including said data lane having said control signal END.

45. The receive processor of claim 44 wherein said IDLE comprises the symbols IDLE_EVEN, IDLE_ODD, IDLE_EVEN_BUSY, and IDLE_EVEN_ODD.

46. The receive processor of claim 45 including a busy signal wherein the reception of IDLE_EVEN_BUSY or IDLE_ODD_BUSY causes said receive processor to assert said busy output.

47. The receive processor of claim 44 wherein said receive decoder uses a 10B/8B decoding method for converting said encoded data into said decoded data.

48. The receive processor of claim 47 wherein each receive deserializer achieves synchronization using the symbols IDLE_EVEN and IDLE_ODD.

49. The receive processor of claim 47 wherein the 10B coding value for symbol START is K27.7.

50. The receive processor of claim 47 wherein the 10B coding value for symbol END is K29.7.

51. The receive processor of claim 47 wherein the 10B coding value for symbol IDLE_EVEN is K28.5.

52. The receive processor of claim 47 wherein the 10B coding value for symbol IDLE_ODD is K23.7.

53. The receive processor of claim 47 wherein the 10B coding value for symbol IDLE_EVEN_BUSY is K28.1.

54. The receive processor of claim 47 wherein the 10B coding value for symbol IDLE_ODD_BUSY is K28.0.

55. The receive processor of claim 47 wherein the 10B encoded values for the symbols START, END, IDLE_EVEN and IDLE_ODD have unique values when compared to any other encoded 10B data value.

56. The receive processor of claim 55 wherein the 10B coding values for the symbols START, END, IDLE_EVEN, and IDLE_ODD are separated by hamming distance 2.

57. The receive processor of claim 44 wherein the number of data lanes n=8.

58. The receive processor of claim 44 wherein the number of data lanes n=4.

59. The receive processor of claim 44 wherein the number of data lanes n=2.

60. The receive processor of claim 44 wherein the number of data lanes n=1.

61. A communications interface for sending or receiving a packet, said packet comprising, in sequence, a header, variable length payload, and a terminator;
   said header includinga START symbol and a TYPE field identifying the format of said payload;
   said terminator including an END symbol;
   wherein said START symbol is transmitted first, followed by the remainder of said header, followed by said variable length packet payload, followed by said terminator;
   where said header TYPE field includes one or more values which indicates that said variable length payload may vary in length from a minimum length to a maximum length;
   wherein said TYPE field uniquely identifies said payload format, said format including Ethernet packets, ATM cells, and control packets;
   and said header includes declaration fields for BPDU, PRIORITY, VLAN_ID, and an application specific field.

62. The interface of claim 61 wherein said BPDU field is 1 bit in size.

63. The interface of claim 62 wherein said PRIORITY field is 3 bits in size.

64. The interface of claim 63 wherein said VLAN_ID field is 12 bits in size.

65. The interface of claim 64 wherein said application specific field is 32 bits in size.

* * * * *